United States Patent
Miyoshi et al.

(10) Patent No.: US 7,358,292 B2
(45) Date of Patent: *Apr. 15, 2008

(54) RELAY BLOCK

(75) Inventors: Takaaki Miyoshi, Kimitsu (JP); Shigeki Katayama, Kawasaki (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/509,612

(22) PCT Filed: Apr. 2, 2003

(86) PCT No.: PCT/JP03/04210

§ 371 (c)(1),
(2), (4) Date: Sep. 30, 2004

(87) PCT Pub. No.: WO03/087225

PCT Pub. Date: Oct. 23, 2003

(65) Prior Publication Data

US 2005/0171262 A1  Aug. 4, 2005

(30) Foreign Application Priority Data

Apr. 2, 2002  (JP) ............................. 2002-100125

(51) Int. Cl.
*C08K 3/08*  (2006.01)

(52) U.S. Cl. ................. 524/440; 361/819; 361/833; 361/834; 523/351; 524/474

(58) Field of Classification Search ............... 523/351; 524/440, 474; 361/819, 833–834
See application file for complete search history.

(56) References Cited

U.S. PATENT DOCUMENTS

| | | | | |
|---|---|---|---|---|
| 5,109,052 A * | 4/1992 | Kasai et al. | ................. | 524/505 |
| 5,260,359 A | 11/1993 | Muehlbach et al. | | |
| 5,283,282 A * | 2/1994 | Hamada et al. | ........... | 525/92 B |
| 5,455,292 A * | 10/1995 | Kakegawa et al. | ......... | 524/141 |
| 5,470,902 A * | 11/1995 | Kubo et al. | ................. | 524/400 |
| 2004/0143061 A1 * | 7/2004 | Nakagawa et al. | ........... | 525/88 |
| 2004/0157978 A1 * | 8/2004 | Nakagawa et al. | ......... | 524/495 |

FOREIGN PATENT DOCUMENTS

| | | |
|---|---|---|
| EP | 0530693 A1 | 3/1993 |
| EP | 1125985 A1 | 8/2001 |
| JP | 5-70682-1 | 3/1993 |
| JP | 6-136256 A | 5/1994 |
| JP | 6-141443 A | 5/1994 |
| JP | 6-184398 A | 7/1994 |
| JP | 08-217972 * | 8/1996 |
| JP | 8-217972 A | 8/1996 |
| JP | 9-169903 A | 6/1997 |
| JP | 11-181271 A | 7/1999 |

OTHER PUBLICATIONS

Partial English language translation of JP-11-181271-A (Jul. 6, 1999).
Partial English language translation of JP-9-169903-A (Jun. 30, 1997).
Partial English language translation of JP-5-70682-1 (Mar. 23, 1993).
Mechanical English language translation of JP-8-217972-A (Aug. 27, 1996).
Mechanical English language translation of JP-6-184398-A (Jul. 5, 1994).
English language translation of JP 11-181271-A (Jul. 6, 1999).
English language translation of JP 9-169903-A (Jun. 30, 1997).
ISO 1133, Plastics-Determination of the melt mass-flow rate (MFR) and the melt volume-flow rate (MVR) of thermoplastics (4th Edition Jun. 1, 2005).

* cited by examiner

*Primary Examiner*—Peter Szekely
(74) *Attorney, Agent, or Firm*—Birch, Stewart, Kolasch & Birch, LLP (57) ABSTRACT

The present invention provides a relay block inhibited from occurrence of melt wrinkles and considerably inhibited from deformation of thin wall portions. That is, the present invention provides a relay block obtained by molding a resin composition which contains a polyamide, a polyphenylene ether and a block copolymer comprising at least one polymer block mainly composed of an aromatic vinyl compound and at least one polymer block mainly composed of a conjugated diene compound and which has a melt volume rate of not less than 60 $cm^3$/10 min. and a dimensional change after water absorption of not more than 1.0%.

25 Claims, 2 Drawing Sheets

RELAY BLOCK

TECHNICAL FIELD

The present invention relates to a relay block comprising a composition which contains a polyamide, a polyphenylene ether and a block copolymer comprising at least one polymer block mainly composed of an aromatic vinyl compound and at least one polymer block mainly composed of a conjugated diene compound and which satisfies a melt volume rate (MVR) of not less than a specific value and a water absorption of not more than a specific value.

BACKGROUND ART

Hitherto, polyamide 6,6 resins have been used for relay blocks provided in an engine room of automobiles, but polyamide 6,6 resins have the problem of an increase in dimensional change due to absorption of water, and recently polyamide/polyphenylene ether alloys have been gradually substituted for the polyamide 6,6 resins. For example, JP-A-6-136256 and JP-A-6-141443 disclose relay boxes for automobiles comprising a composition which is composed of polyamide 6,6, polyamide 6, a modified polyphenylene ether, a montanic acid metal salt and (polypropylene) and which is excellent in moldability, mechanical strengths, heat resistance, weathering resistance and recycling properties. Furthermore, JP-A-6-184398 discloses relay boxes for automobiles comprising a composition which is composed of polyamide 6,6, polyamide 6, a modified polyphenylene ether, an A-B-A type block copolymer, a polypropylene, an ethylene-α-olefin copolymer and a montanic acid metal salt and which is excellent in flowability, releasability, mechanical strengths, heat resistance, weathering resistance and recycling properties.

Recently, most automobile parts are electronically controlled, and the role of relay blocks which assemble electrical equipment has become very important. Nevertheless, at present, the space permitted for relay blocks in a highly densified engine room becomes smaller and smaller. Thus, for disposing the relay block in a limited space, the structure of a relay block is very complicated and simultaneously the molded product has many thin wall portions. As a result, it is required that the resin have higher flowability in a mold during the step of producing relay blocks.

For improving the flowability of resin in a mold, there are mainly two methods of reducing the melt viscosity of the resin per se and reducing the solidification speed of the resin. However, in the case of reducing the rate of solidification, the after-shrinkage of molded products becomes great, which causes problems in a use such as relay blocks which are exposed to various environments after molding.

Therefore, it is realized that in a use as a relay block, reducing the melt viscosity of resin per se is the most effective means for improving flowability of the resin in a mold. Accordingly, one of the characteristics required for recent relay blocks is the reduction of melt viscosity of the resin per se constituting the relay blocks.

On the other hand, in relay blocks having a complicated structure, if the rate of dimensional change caused by water absorption is great, the size of the socket portion changes and the socket cannot be drawn out or the socket falls off. Therefore, another characteristic required for recent relay blocks is use of materials which are small in dimensional change caused by water absorption of the materials constituting the relay blocks.

Furthermore, in the case of relay blocks including both thin wall portions and thick wall portions, melt wrinkles (a plurality of wrinkled asperities present in parallel) partially occur on single surface of the molded articles. In Japanese, this phenomenon is called "YUJIWA" by one skilled in the art, and often occur on the part in which the portions greatly differ in wall thickness. This causes not only a problem in appearance, but also is apt to become a starting point of cracking caused by vibration fatigue during operation for a long time, if the melt wrinkles are present on the stress generation portion, and, in the worst case, results in breakage. Thus, improvement in this respect is required. Therefore, an additional characteristic required for recent relay blocks is that the molded relay block has no melt wrinkles on the surface.

The above-mentioned relay blocks according to conventional technologies cannot be said to sufficiently possess the characteristics required for recent relay blocks and the development of relay blocks according to new technologies has been desired.

DISCLOSURE OF THE INVENTION

The present invention provides a novel relay block which satisfies all of the above characteristics required for recent relay blocks (namely, reduction of melt viscosity of resin per se constituting the relay block/decrease of dimensional change of material constituting the relay block upon water absorption/absence of melt wrinkles on the surface of the molded relay block).

That is, the present invention provides the following attributes.

(1) A relay block that is free from melt wrinkles and comprising a resin composition which contains a polyamide, a polyphenylene ether and a block copolymer comprising at least one polymer block mainly composed of an aromatic vinyl compound and at least one polymer block mainly composed of a conjugated diene compound and which has a melt volume rate (MVR) [measured at a test temperature of 280° C. under a load of 5.0 kg in accordance with method B of ISO1133: 1997] of not less than 60 cm$^3$/10 min. and a dimensional change after water absorption [change of dimension in the flow direction after being subjected to water absorption treatment at a temperature of 90° C. and a humidity of 95% for 72 hours as compared with the dimension before subjecting to the water absorption treatment (measured using a plate of type D2 of 2 mm thickness specified in ISO294-3: 1996 which is molded at a melting temperature of 290° C. and a mold temperature of 90° C. under the molding conditions specified in ISO15103-2: 1997)] of not more than 1.0%.

(2) A relay block described in the above (1) which has, at a periphery of a slit of a bus bar inserting portion constituting a part of the relay block, parallel planes having the same shape which form the slit and are disposed opposite to each other, and has a degree of deformation between the parallel planes of not more than 1% (a value obtained by dividing the difference between the maximum and minimum values of a distance measured in the horizontal direction between the parallel planes at the uppermost part of the parallel planes by a unit length of the parallel planes in the horizontal direction).

(3) A relay block described in the above (1) wherein the ratio of wall thickness of the relay block (the ratio of thickness of the maximum wall thickness portion to the thickness of minimum wall thickness portion) satisfies a range of not less than 10.

(4) A relay block described in the above (1) wherein the weight of molded product per one gate in molding of the relay block is not less than 20 g.

(5) A relay block described in the above (1) wherein the resin composition constituting the relay block has a deflection temperature under load [measured in accordance with ASTM D648-95 using a test piece of about 6.4 mm in width at a stress of 1.82 MPa] of not lower than 105° C.

(6) A relay block described in the above (1) wherein the resin composition constituting the relay block has a shrinkage anisotropy [the ratio of molding shrinkage in the direction perpendicular to the flow direction to the molding shrinkage in the direction parallel to the flow direction measured in accordance with ISO 294-4: 1997 using a plate of type D2 of 2 mm thickness specified in ISO294-3:1996 molded at a melting temperature of 290° C. and a mold temperature of 90° C. under the molding conditions specified in IS015103-2: 1997] of 0.70-1.30.

(7) A relay block described in the above (1) wherein the resin composition further contains an oil.

(8) A relay block described in the above (1) wherein the content of polyamide in the resin composition is 55-70% by weight.

(9) A relay block described in the above (1) wherein polyamide 6,6 is contained in an amount of not less than 70% by weight of the total amount of the polyamide in the resin composition.

(10) A relay block described in the above (8) or (9) wherein the polyamide in the resin composition is a mixture of polyamide 6,6 and polyamide 6.

(11) A relay block comprising a resin composition which contains a polyamide, a polyphenylene ether and a block copolymer comprising at least one polymer block mainly composed of an aromatic vinyl compound and at least one polymer block mainly composed of a conjugated diene compound and further contains a flame retardant containing substantially no halogen in an amount effective for flame retardation of the resin composition.

(12) A relay block described in the above (11) wherein the flame retardant containing substantially no halogen comprises two or more flame retardants.

(13) A relay block described in the above (11) wherein the flame retardant containing substantially no halogen is a mixture of a flame retardant effective for flame retardation of polyamide and a flame retardant effective for flame retardation of polyphenylene ether.

(14) A relay block described in the above (11) wherein the resin composition has a melt volume rate (MVR) [measured at a test temperature of 280° C. and under a load of 5.0 kg in accordance with method B of ISO1133: 1997] of not less than 60 cm³/10 min. and a dimensional change after water absorption [change of dimension in the flow direction after subjecting to water absorption treatment at a temperature of 90° C. and a humidity of 95% for 72 hours as compared with the dimension before subjecting to the water absorption treatment (measured using a plate of type D2 of 2 mm thick specified in ISO294-3:1996 which is molded at a melting temperature of 290° C. and a mold temperature of 90° C. under the molding conditions specified in ISO15103-2: 1997)] of not more than 1.0%.

(15) A relay block described in the above (11) wherein the resin composition has a deflection temperature under load [measured in accordance with ASTM D648-95 using a test piece of about 6.4 mm in width under a load of 1820 kPa] of not lower than 105° C. (16) A resin composition which contains a polyamide, a polyphenylene ether and a block copolymer comprising at least one polymer block mainly composed of an aromatic vinyl compound and at least one polymer block mainly composed of a conjugated diene compound and oil and which has a melt volume rate (MVR) [measured at a test temperature of 280° C. under a load of 5.0 kg in accordance with method B of ISO1133: 1997] of not less than 60 cm³/10 min. and a dimensional change after water absorption [change of dimension of a molded piece in the flow direction after being subjected to water absorption treatment at a temperature of 90° C. and a humidity of 95% for 72 hours as compared with the dimension just after molding (measured using as the molded piece a plate of type D2 of 2 mm thickness specified in ISO294-3: 1996 which is molded at a melting temperature of 290° C. and a mold temperature of 90° C. under the molding conditions specified in ISO15103-2: 1997)] of not more than 1.0%.

(17) A resin composition described in the above (16) wherein the oil is mainly composed of paraffin.

(18) A resin composition described in the above (16) wherein the polyamide has a viscosity number of 100-130 ml/g measured in 96% sulfuric acid in accordance with ISO307: 1994.

(19) A resin composition described in the above (16) wherein polyamide 6,6 is contained in an amount of not less than 70% by weight of the total amount of the polyamide.

(20) A resin composition described in the above (18) or (19) wherein the polyamide is a mixture of polyamide 6,6 and polyamide 6.

(21) A resin composition described in the above (16) which contains at least one transition metal selected from copper, nickel and cobalt in an amount of 10-200 ppm and at least one halogen selected from chlorine, iodine and bromine in an amount of 500-1500 ppm.

(22) A resin composition described in the above (16) wherein a transition metal and/or a halogen are previously mixed with the polyamide and then the polyamide is blended in the resin composition.

(23) A resin composition described in the above (22) wherein the transition metal and/or the halogen are previously added to polyamide 6 at a high concentration (500 ppm or higher for the transition metal and 10000 ppm or higher for the halogen) and then the polyamide 6 is blended in the resin composition.

(24) A resin composition described in the above (16) which contains a flame retardant containing substantially no halogen.

(25) A resin composition described in the above (24) wherein the flame retardant containing substantially no halogen is a mixture of two or more flame retardants.

(26) The resin composition described in the above (24) or (25) wherein the flame retardant containing substantially no halogen is a mixture of a flame retardant effective for flame retardation of polyamide and a flame retardant effective for flame retardation of polyphenylene ether.

(27) A resin composition described in either one of the above (16)-(26) which is used as a relay block.

BEST MODE FOR CARRYING OUT THE INVENTION

The present invention will be explained in detail below.

The term "relay block" in the present invention means a part comprising an assembly of relays, fuses, etc. which are mainly disposed in an automobile engine room, etc., and is also called relay box, junction block, junction box, etc. These are all the same.

The term "melt wrinkles" in the present invention is called "YUJIWA" in Japanese by one skilled in the art and mean at least a plurality of wrinkles which are present in parallel with each other and in close vicinity to each other. The shape of the melt wrinkles includes a fan shape, wavy shape and the like.

The wrinkles occur, for example, due to nonuniformity in flow velocity caused by the coexistence of thick wall portions and thin wall portions, due to sliding caused near the gate, due to jetting, and the like.

Figure 3A:
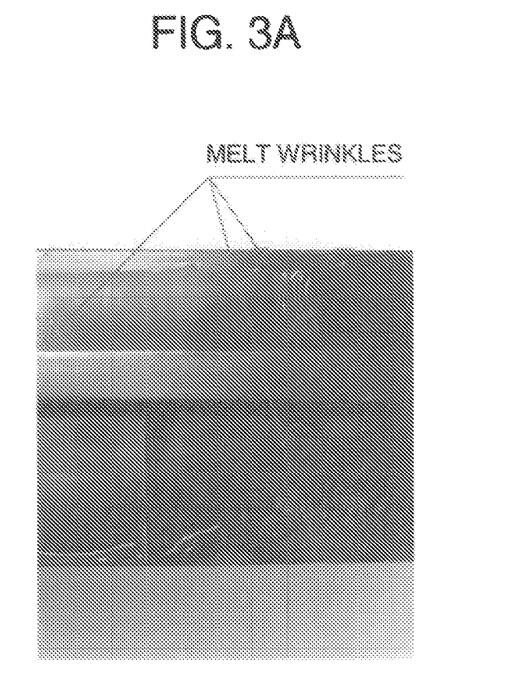
FIG. 3A is a photograph of melt wrinkles (a plurality of wrinkled asperities present in parallel).
Figure 3B:
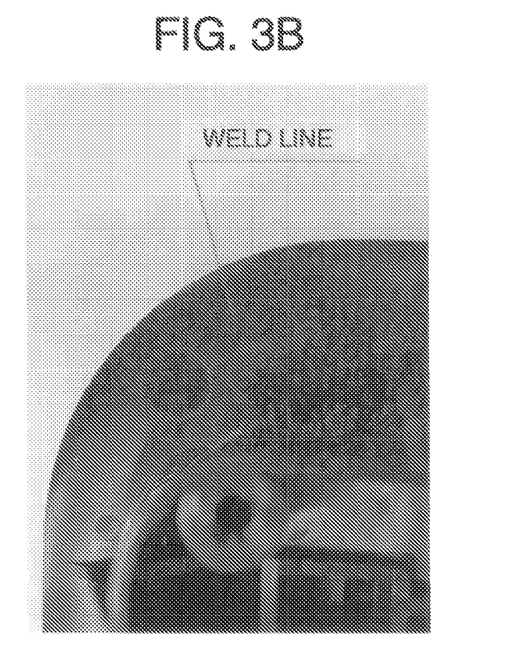
FIG. 3B is a photograph of a wrinkle in the weld portion (a single dent wrinkle).

The melt wrinkles in the present invention are clearly distinguished from a weld line which is formed, for example, at the resin meeting position due to welding (the weld line is usually one line and does not comprise a plurality of parallel lines). The weld line does not correspond to the wrinkles in the present invention. For reference, a photograph of the melt wrinkles (wrinkled asperities) of the present invention is shown in FIG. 3A and a photograph of the weld line is shown in FIG. 3B.

The MVR in the present invention is an abbreviation for melt volume rate and can be obtained by calculation from a piston moving distance for a given period which is measured at a test temperature of 280° C. and under a load of 5.0 kg in accordance with method B of ISO1133: 1997.

The MVR of the resin composition usable for the relay block of the present invention must be not less than 60 $cm^3/10$ min., and is preferably not less than 70 $cm^3/10$ min., more preferably not less than 80 $cm^3/10$ min. When the MVR of the resin composition is not less than 60 $cm^3/10$ min., the residual strain of a relay block comprising the resin composition after molding is not great and, hence, distortion of thin wall portions can be inhibited. The MVR of the resin composition has no particular upper limit, but when it is not more than 150 $cm^3/10$ min., there is no need to care about the occurrence of cracking of relay blocks comprising the resin composition even if they are used for a long period of time.

For the measurement of dimensional change of the resin composition after absorption of water in the present invention, there is used a plate of type D2 (2 mm thick) specified in ISO294-3:1996 which is molded in accordance with ISO15103-2: 1997, except that the melting temperature is 290° C. and the mold temperature is 90° C.

The dimensional change after water absorption is calculated by the following formula.

$$S_{WP}=100(l_2-l_1)/l_1$$

In the above formula, $S_{WP}$ represents a dimensional change after absorption of water. $l_1$ represents a length (unit: mm) of the type D2 molded plate in the direction parallel to the flow direction after the plate is left to stand for conditioning for 48 hours in an environment of a temperature of 23° C. and a humidity of 50%. And $l_2$ represents a length (unit: mm) of the type D2 plate in the direction parallel to the flow direction after the type D2 plate which has been subjected to conditioning and measurement of dimension is left to stand for 72 hours in an environment of a temperature of 90° C. and a humidity of 95% and then taken out whereby water on the surface of the molded piece is wiped off, and the molded piece is left to stand for 30 minutes in an environment of a temperature of 23° C. and a humidity of 50%.

The $l_1$ and $l_2$ in this case are measured on a central point in the width direction of the molded piece by a device which can measure to the order of 0.01 mm.

This measurement is conducted on five different test pieces and the results are subjected to arithmetical averaging to obtain a dimensional change after water absorption.

The dimensional change after water absorption of resin composition usable for the relay block of the present invention must be not more than 1.0%, and is preferably not more than 0.99% and more preferably not more than 0.98%.

In general, a relay block is mounted on automobiles, etc. and placed in various environments. When the dimensional change of the resin composition constituting the relay block after absorption of water is not more than 1.0%, even when it is placed in an environment of high temperature and high humidity, for example, the socket portion can be inhibited from falling off. There is no particular lower limit, and the value should not be minus and may be 0 or more.

It is desirable that the relay block of the present invention has, at a periphery of a slit of a bus bar inserting portion constituting a part of the relay block, parallel planes having the same shape which form the slit and are disposed opposite to each other, and has a degree of deformation between the parallel planes of not more than 1% (a value obtained by dividing a difference between the maximum value and minimum value of a distance measured in the horizontal direction between the parallel planes at the uppermost part of the parallel planes by a unit length of the parallel planes in the horizontal direction), namely, a proportion of deviation in parallelism of the opposite parallel planes which ideally must be mathematically exactly parallel to each other is not more than 1%. The unit length is intended to mean a design value of a distance between the parallel planes at the uppermost part of the parallel planes which is to be a length between the above-mentioned maximum value and minimum value (a distance between parallel planes which should be mathematically exactly parallel). When there is a rib for supporting the bus bar, the unit length is also expressed by an interval between wall surfaces present in parallel opposite to the bus bar without including the rib. The measurement of dimension is conducted on the distance between inner wall surfaces.

The distance between the above parallel planes can be measured, for example, by a method of actually measuring the distance between the inner walls using a contact type three-dimensional size measuring device, a method of photographing from above and measuring the distance from the picture image, and other methods. Any of these methods can be employed, but preferred is the method of actually measuring the distance between the inner walls using a contact type three-dimensional size measuring device.

The degree of deformation between parallel planes defined above is more preferably not more than 0.8% and most preferably not more than 0.5%. When the degree of deformation is not more than 1%, occurrence of problems such as failure in inserting of a bus bar and deformation of a bus bar after inserting can be prevented.

The relay block comprising the resin composition of the present invention is not large in residual strain after molding because it has an MVR value higher than a predetermined value, and hence the resin composition is suitable especially for a relay block which is large in a ratio of thickness of a maximum wall thickness portion to a thickness of a minimum wall thickness portion in the molded piece. Of course, it is also applicable to a relay block of smaller thickness ratio. The resin composition of the present invention is suitable especially for a relay block in which the ratio of thickness of a maximum wall thickness portion to that of a minimum wall thickness portion is not less than 10. It is more suitable for a relay block of not less than 20 in the thickness ratio.

Further, since the resin composition of the present invention has a high flowability, it can be applied to a relay block having such a shape wherein the weight per one gate (resin pouring port for molding of relay block) is 20 g or more. Among them, the resin composition is particularly suitable for a relay block having such a shape wherein the weight per one gate is 30 g or more. If the number of gates is increased, the shape of the mold is more complicated, and in general the number of gates is preferably smaller. Therefore, the resin composition of the present invention is a material which meets the market demand.

The resin composition which can be used for the relay block of the present invention preferably has a deflection temperature under load of not lower than 105° C. [measured in accordance with ASTM D648-95 using a test piece of about 6.4 mm in width under a stress of 1.82 MPa]. The deflection temperature under load is more preferably not lower than 110° C. When the deflection temperature under load is not lower than 105° C., the relay block can be prevented from deformation caused by the heat in the engine room.

In order to increase the deflection temperature under load to 105° C. or higher, for example, it is necessary that the content of the disperse phase (mainly corresponding to the polyphenylene ether and the block copolymer comprising at least one polymer block mainly composed of an aromatic vinyl compound and at least one polymer block mainly composed of a conjugated diene compound) in the resin composition is not less than 20% by weight (when the total amount of the composition is assumed to be 100% by weight) and the content of polyphenylene ether in the disperse phase is not less than 50% by weight (when the total amount of the polyphenylene ether and the block copolymer comprising at least one polymer block mainly composed of an aromatic vinyl compound and at least one polymer block mainly composed of a conjugated diene compound is assumed to be 100% by weight).

From the viewpoint of inhibition of warpage and deformation, it is preferred that the resin composition usable for the relay block of the present invention has a shrinkage anisotropy [a ratio of a molding shrinkage in the direction perpendicular to the flow direction to a molding shrinkage in the direction parallel to the flow direction which are measured in accordance with ISO294-4: 1997 using a plate of type D2 of 2 mm thickness specified in ISO294-3: 1996 molded at a melting temperature of 290° C. and a mold temperature of 90° C. under the molding conditions specified in ISO15103-2: 1997] of 0.70-1.30.

In order to give an anisotropy of molding shrinkage of the resin composition in the range of 0.70-1.30, for example, it is necessary that the content of the disperse phase (mainly corresponding to a polyphenylene ether and a block copolymer comprising at least one polymer block mainly composed of an aromatic vinyl compound and at least one polymer block mainly composed of a conjugated diene compound) in the resin composition is less than 50% by weight.

Next, components usable for a polyamide/polyphenylene ether resin composition which can be used for the relay block of the present invention will be explained in detail below.

As polyamides usable in the present invention, there may be used any polyamides so long as they have an amide linkage {—NH—C(=O)—} in the polymer main chain.

In general, polyamides are obtained by ring opening polymerization of lactams, polycondensation of diamine and dicarboxylic acid, polycondensation of aminocarboxylic acids, and the like, and the polyamides are not limited to those obtained in this way.

The diamines used are roughly classified into aliphatic, alicyclic and aromatic diamines. Examples of the diamines are tetramethylenediamine, hexamethylenediamine, undecamethylenediamine, dodecamethylenediamine, tridecamethylenediamine, 2,2,4-trimethylhexamethylenediamine, 2,4,4-trimethylhexamethylenediamine, 5-methylnanomethylenediamine, 1,3-bisaminomethylcyclohexane, 1,4-bisaminomethylcyclohexane, m-phenylenediamine, p-phenylenediamine, m-xylylenediamine, p-xylylenediamine, etc.

The dicarboxylic acids used are roughly classified into aliphatic, alicyclic and aromatic dicarboxylic acids. Examples of the dicarboxylic acids are adipic acid, suberic acid, azelaic acid, sebacic acid, dodecanedioic acid, 1,1,3-tridecanedioic acid, 1,3-cyclohexanedicarboxylic acid, terephthalic acid, isophthalic acid, naphthalenedicarboxylic acid, dimer acids, etc.

Examples of the lactams used are ε-caprolactam, enantholactam, ω-laurolactam, etc.

Examples of the aminocarboxylic acids are ε-aminocaproic acid, 7-aminoheptanoic acid, 8-aminooctanoic acid, 9-aminononanoic acid, 11-aminoundecanoic acid, 12-aminododecanoic acid, 13-aminotridecanoic acid, etc.

In the present invention, there may be used any copolymer polyamide obtained by polycondensation of one or two or more of the above lactams, diamines, dicarboxylic acids and ω-aminocarboxylic acids.

Furthermore, there may be suitably used polyamides obtained by polymerizing these lactams, diamines, dicarboxylic acids and ω-aminocarboxylic acids up to oligomers of low molecular weight in a polymerization reactor and then allowing them to have a high molecular weight by an extruder or the like.

As the polyamides effectively usable in the present invention, mention may be made of polyamide 6, polyamide 6,6, polyamide 4,6, polyamide 11, polyamide 12, polyamide 6,10, polyamide 6,12, polyamide 6/6,6, polyamide 6/6,12, polyamide 6,MXD (m-xylylenediamine), polyamide 6,T, polyamide 6,I, polyamide 6/6,T, polyamide 6/6,I, polyamide 6,6/6,T, polyamide 6,6/6,I, polyamide 6/6,T/6,I, polyamide 6,6/6,T/6,I, polyamide 6/12/6,T, polyamide 6,6/12/6,T, polyamide 6/12/6,I, polyamide 6,6/12/6,I, etc. Furthermore, polyamides obtained by copolymerizing two or more polyamides by an extruder or the like can also be used. Preferred are polyamide 6, polyamide 6,6, polyamide 6/6,6 and mixtures thereof.

Polyamide 6,6 or a mixture of polyamide 6,6 and polyamide 6 is most preferred.

The amount of polyamide 6,6 in the mixture of polyamide 6,6 and polyamide 6 is desirably not less than 70% by weight and more preferably not less than 85% by weight when the total amount of all polyamides used is assumed to be 100% by weight.

A preferred viscosity number of the polyamide used in the present invention is 100-130 ml/g measured in 96% sulfuric acid in accordance with ISO307: 1994. By using a polyamide having a viscosity number within the above range, the flowability and mechanical strength of the resin composition can be well balanced. The viscosity number is more preferably 110-128 ml/g.

The polyamide usable for the relay block of the present invention may be a mixture of two or more polyamides differing in viscosity number. When two or more polyamides are used, the viscosity number of the polyamide mixture is also desirably within the above range. That the viscosity number of the polyamide mixture is within the above range can be easily confirmed by actually measuring the viscosity number of the polyamide mixture having a desired mixing ratio.

The terminal group of the polyamides participates in the reaction with polyphenylene ether. Polyamides generally have an amino group or carboxyl group as a terminal group, and, in general, impact resistance decreases and flowability improves with increase of the concentration of carboxyl group and, on the other hand, impact resistance increases and flowability deteriorates with increase of the concentration of amino group.

The ratio of these terminal groups, namely, amino group/carboxyl group in concentration is preferably 9/1-1/9, more preferably 6/4-1/9, further preferably 5/5-1/9.

The concentration of the terminal amino group is preferably not more than $5\times10^5$ mol/g, more preferably not more than $4\times10^5$ mol/g, most preferably not more than $3.5\times10^5$ mol/g. There is no particular limitation in the lower limit, but it is desirably $1\times10^5$ mol/g or more. When the concentration of the terminal amino group is not more than $5\times10^5$ mol/g, considerable deterioration of flowability of the composition in a mold, increase of deformation of the molded product after heating and occurrence of a wrinkle-pattern (melt wrinkles) on the molded piece can be inhibited.

These terminal groups of polyamide resins can be adjusted by a method known to one skilled in the art. For example, at least one compound selected from diamine compounds, monoamine compounds, dicarboxylic acid compounds, monocarboxylic acid compounds, etc. is added at the time of polymerization of the polyamide resin so as to give a desired terminal group concentration.

Moreover, for the purpose of further improvement of heat stability imparted by the polyamide resin to the resin composition, a transition metal and/or a halogen may be contained in the resin composition. The transition metal is not particularly limited, but copper, cerium, nickel and cobalt are preferred, and copper is especially preferred. As halogens, bromine or iodine is preferred.

The amount of transition metal is preferably not less than 10 ppm and less than 200 ppm, more preferably not less than 10 ppm and less than 100 ppm in the resin composition. The amount of halogen is preferably not less than 500 ppm and less than 1500 ppm, more preferably not less than 700 ppm and less than 1200 ppm.

The method for adding the transition metal and/or halogen to the resin composition includes, for example, a method of adding them in the form of a powder at the time of melt kneading of the composition of polyamide/polyphenylene ether, a method of adding them at the time of polymerization of the polyamide, a method of preparing a master pellet by adding them to the polyamide at a high concentration and then adding the master pellet to the resin composition, and other methods, and any of these methods can be employed. Of these methods, preferred are the method of adding them at the time of polymerization of the polyamide and the method of preparing a master pellet by adding them to the polyamide at a high concentration and then adding the master pellet to the resin composition, and the latter method is most preferred.

Among the methods of preparing a master pellet by adding them to a polyamide at a high concentration and then adding the master pellet to the resin composition, most preferred is a method of addition in the form of a master pellet of polyamide 6 as a base which contains 500 ppm or more of transition metal and 15,000 ppm or more of halogen. Use of this method can further inhibit deterioration of mechanical characteristics after heat aging (improvement in heat stability). The reason is not clear, but one factor is considered that when a transition metal or halogen is present in polyamide 6 of low crystallinity, ionization readily occurs, which is apt to contribute to stabilization of the polyamide.

Moreover, in the present invention, in addition to the above materials, known organic stabilizers can also be used without any problems. Examples of the organic stabilizers are hindered phenolic antioxidants such as Irganox 1098 (manufactured by Ciba Speciality Chemicals Inc.), phosphorus-based processing heat stabilizers such as Irgafos 168 (manufactured by Ciba Speciality Chemicals Inc.), lactone-based processing heat stabilizers such as HP-136 (manufactured by Ciba Speciality Chemicals Inc.), sulfur-based heat stabilizers, hindered amine-based light stabilizers, etc.

Of these organic stabilizers, hindered phenolic antioxidants, phosphorus-based processing heat stabilizers or combinations thereof are more preferred.

The amount of organic stabilizers is preferably 0.001-1 part by weight based on 100 parts by weight of polyamide resin.

In addition to the above additives, other known additives which can be added to polyamides may be added in an amount of less than 10 parts by weight based on 100 parts by weight of polyamide.

The polyphenylene ether usable in the present invention is a homopolymer and/or copolymer comprising the following structural unit of the following formula (1):

(1)

[in the above formula, O represents an oxygen atom and R independently of one another represents hydrogen, halogen, primary or secondary lower alkyl, phenyl, haloalkyl, aminoalkyl, hydrocarbonoxy or halohydrocarbonoxy (with a proviso that at least two carbon atoms separate the halogen atom and oxygen atom)].

Specific examples of the polyphenylene ether of the present invention are poly(2,6-dimethyl-1,4-phenylene ether), poly(2-methyl-6-ethyl-1,4-phenylene ether), poly(2-methyl-6-phenyl-1,4-phenylene ether), poly(2,6-dichloro-1,4-phenylene ether), etc., and further include polyphenylene ether copolymers such as copolymers of 2,6-dimethylphenol with other phenols (for example, copolymers of 2,6-dimethylphenol with 2,3,6-trimethylphenol or 2-methyl-6-butylphenol as disclosed in JP-B-52-17880).

Among them, especially preferred are poly(2,6-dimethyl-1,4-phenylene ether), copolymers of 2,6-dimethylphenol with 2,3,6-trimethylphenol or mixtures thereof.

The method for producing the polyphenylene ether used in the present invention is not particularly limited and includes known methods. For example, there may be used those which are disclosed in U.S. Pat. Nos. 3,306,874, 3,306,875, 3,257,357 and 3,257,358, JP-A-50-51197, JP-B-52-17880 and JP-B-63-152628.

The reduced viscosity of polyphenylene ether constituting the relay block of the present invention (measured by Ubbelohde's viscosity tube using a 0.5 g/dl chloroform solution at 30° C.) is preferably 0.40-0.45 dl/g, more preferably 0.41-0.45 dl/g.

In the present invention, a mixture of two or more polyphenylene ethers differing in reduced viscosity can be used suitably so long as the reduced pressure of the mixture is within the above range.

Furthermore, in the polyphenylene ether usable in the present invention, an organic solvent used as a polymerization solvent may remain in an amount of less that 5% by weight based on 100% by weight of polyphenylene ether. The organic solvent remaining after it is used as a polymerization solvent is difficult to completely remove at the drying step after polymerization, and usably remains in an amount of from several hundred ppm to several percent. Examples of the organic solvent used as a solvent for polymerization of polyphenylene ether are at least one member from isomers of toluene or xylene, ethylbenzene, alcohols of 1-5 carbon atoms, chloroform, dichloromethane, chlorobenzene, dichlorobenzene, etc.

Moreover, the polyphenylene ether usable in the present invention may be a wholly or partly modified polyphenylene ether. The modified polyphenylene ether here means a polyphenylene ether modified with at least one modifying compound which has at least one carbon-carbon double bond or triple bond and at least one carboxylic acid group, acid anhydride group, amino group, hydroxyl group or glycidyl group in the molecular structure.

For producing the modified polyphenylene ether, in the presence or absence of a radical initiator, (1) polyphenylene ether is reacted with a modifying compound at a temperature of 100° C. or higher and lower than the glass transition temperature of the polyphenylene ether without melting the polyphenylene ether, (2) polyphenylene ether is melt kneaded and reacted with a modifying compound at a temperature of not lower than the glass transition temperature of the polyphenylene ether and not higher than 360° C., or (3) polyphenylene ether is reacted with a modifying compound in a solution at a temperature lower than the glass transition temperature of the polyphenylene ether. Any of these methods can be used, but the method (1) or (2) is preferred.

Next, at least one modifying compound which has at least one carbon-carbon double bond or triple bond and at least one carboxylic acid group, acid anhydride group, amino group, hydroxyl group or glycidyl group in the molecular structure will be specifically explained.

Examples of modifying compounds having simultaneously carbon-carbon double bond and carboxylic acid group or acid anhydride group in the molecule are maleic acid, fumaric acid, chloromaleic acid, cis-4-cyclohexene-1,2-dicarboxylic acid and acid anhydrides thereof. Among them, fumaric acid, maleic acid and maleic anhydride are preferred, and fumaric acid and maleic anhydride are especially preferred. Moreover, one or two of the two carboxyl groups of these unsaturated dicarboxylic acids may be esterified.

Examples of modifying compounds having simultaneously carbon-carbon double bond and glycidyl group in the molecule are allyl glycidyl ether, glycidyl acrylate, glycidyl methacrylate, epoxidized natural fats and oils, etc. Among them, glycidyl acrylate and glycidyl methacrylate are especially preferred.

Examples of modifying compounds having simultaneously carbon-carbon double bond and hydroxyl group in the molecule are unsaturated alcohols of the formula $C_nH_{2n-3}OH$ (n is a positive integer) such as allyl alcohol, 4-pentene-1-ol and 1,4-pentadiene-3-ol, unsaturated alcohols of the formulas $C_nH_{2n-5}OH$ and $C_nH_{2n-7}OH$ (n is a positive integer), and the like.

The above modifying compounds may be used each alone or in combination of two or more.

The amount of modifying compound used for preparation of modified polyphenylene ether is preferably 0.1-10 parts by weight, more preferably 0.3-5 parts by weight based on 100 parts by weight of polyphenylene ether.

Preferred amount of radical initiator used for preparation of radical initiator-modified polyphenylene ether is 0.001-1 part by weight based on 100 parts by weight of polyphenylene ether.

Furthermore, the addition rate of the modifying compound to the modified polyphenylene ether is preferably 0.01-5% by weight, more preferably 0.1-3% by weight.

In the modified polyphenylene ether, unreacted modified compound and/or polymer of the modifying compound may remain in an amount of less than 1% by weight.

In order to reduce the amount of unreacted modifying compound and/or polymer of the modifying compound remaining in the modified polyphenylene ether, if necessary, a compound having an amide linkage and/or amino group may be added in preparation of the modified polyphenylene ether.

The compound having an amide linkage is intended to mean a compound having the amide linkage {—NH—C (=O)—} structure in the molecular structure, and the compound having an amino group is intended to mean a compound having the {—NH$_2$} structure at the terminal. Specific examples of the compound having an amide linkage and/or amino group are aliphatic amines such as octylamine, nonylamine, tetramethylenediamine and hexamethylenediamine, aromatic amines such as aniline, m-phenylenediamine, p-phenylenediamine, m-xylylenediamine and p-xylylenediamine, reaction products of these amines with carboxylic acids, dicarboxylic acids, etc., lactams such as ε-caprolactam, polyamide resins, and the like, but the compound is not limited to these examples.

The amount of the addition of the compound having an amide linkage and/or amino group is preferably not less than 0.001 part by weight and less than 5 parts by weight, more preferably not less than 0.01 part by weight and less than 1 part by weight, further preferably not less than 0.01 part by weight and less than 0.1 part by weight based on 100 parts by weight of polyphenylene ether.

Moreover, in the present invention, a styrenic thermoplastic resin may be added in an amount of less than 50 parts by weight based on 100 parts by weight of polyamide and polyphenylene ether in total.

Examples of the styrenic thermoplastic resins in the present invention are homopolystyrenes, rubber-modified polystyrenes (HIPS), styrene-acrylonitrile copolymers (AS resin), styrene—rubber-like polymer—acrylonitrile copolymers (ABS resin), etc.

Further, various stabilizers which are known for stabilization of polyphenylene ether can be suitably used. Examples of the stabilizers are metallic stabilizers such as zinc oxide and zinc sulfide, and organic stabilizers such as hindered phenolic stabilizers, phosphorus-based stabilizers and hindered amine stabilizers, and the preferred amount of the stabilizers is less than 5 parts by weight based on 100 parts by weight of polyphenylene ether.

In addition, known additives that can be added to polyphenylene ether may be added in an amount of less than 10 parts by weight based on 100 parts by weight of polyphenylene ether.

In the block copolymer comprising at least one polymer block mainly composed of an aromatic vinyl compound and at least one polymer block mainly composed of a conjugated diene compound which can be used in the present invention, specific examples of the aromatic vinyl compound constituting a part of the block copolymer are styrene, α-methylstyrene, vinyltoluene, etc., but the aromatic vinyl compounds are not limited to these examples. These aromatic vinyl compounds may also be used in combination of two or more. Styrene is particularly preferred.

Specific examples of the conjugated diene compound constituting a part of the block copolymer are butadiene, isoprene, piperylene, 1,3-pentadiene, etc., but the conjugated diene compound is not limited to these examples. These conjugated diene compounds may also be used in combination of two or more. Butadiene, isoprene or a combination of them is preferred.

The wording "mainly composed of" in this specification and the appended claims is intended to mean containing an amount of 50% or more, more preferably 70% or more.

When butadiene is used as the conjugated diene compound of the block copolymer, the microstructure of the polybutadiene block portion preferably contains 5-80% of the total amount of 1,2-vinyl bond and 3,4-vinyl bond, and this is more preferably 10-50%, most preferably 15-40%. Normally, the bond form of the conjugated diene compound includes a 1,2-vinyl bond, 3,4-vinyl bond and 1,4 vinyl bond. And, the amount of vinyl bond is intended to mean the proportion of the bond form of conjugated diene compound at the time of polymerization. For example, an amount of 1,2-vinyl bond means the proportion of 1,2-vinyl bond in the above three bond forms, and it can be easily determined by an infrared spectrophotometer, nuclear magnetic resonance device, etc.

The block copolymer comprising at least one polymer block mainly composed of an aromatic vinyl compound and at least one polymer block mainly composed of a conjugated diene compound in the present invention is preferably a block copolymer having a bonding type selected from i-ii type, i-ii-i type and i-ii-i-ii type, where (i) represents the polymer block mainly composed of aromatic vinyl compound and (ii) represents the polymer block mainly composed of conjugated diene compound. Among these types, more preferred are i-ii-i type and i-ii-i-ii type, and most preferred is i-ii-i type. These may be mixtures.

In the present invention, a hydrogenated block copolymer of aromatic vinyl compound and conjugated diene compound can also be used. That is, this hydrogenated block copolymer is intended to mean the above-mentioned block copolymer of aromatic vinyl compound and conjugated diene compound in which aliphatic double bonds are subjected to hydrogenation treatment in such a manner that more than 0% and up to 100% of the double bonds are hydrogenated. The hydrogenation rate of the hydrogenated block copolymer is preferably 50% or higher, more preferably 80% or higher and most preferably 95% or higher.

In the present invention, the block copolymer (which may be hydrogenated) of aromatic vinyl compound and conjugated diene compound preferably has a number-average molecular weight of not less than 150,000.

The number-average molecular weight is intended to mean a number-average molecular weight measured by an ultraviolet spectrodetector using a gel permeation chromatography measuring apparatus and calculated in terms of standard polystyrene. In this case, there may be detected low molecular weight components due to deactivation of catalyst during polymerization, and in such a case, the low molecular weight components are not included in the calculation of the molecular weight. Typically, the calculated exact molecular weight distribution (weight-average molecular weight/number-average molecular weight) is within the range of 1.0-1.1.

In the present invention, the number-average molecular weight of one polymer block mainly composed of aromatic vinyl compound is desirably not less than 30,000. When the number-average molecular weight of one polymer block mainly composed of aromatic vinyl compound is not less than 30,000, the aromatic vinyl compound block in the block copolymer is easily compatibilized with polyphenylene ether.

The number-average molecular weight of one polymer block mainly composed of aromatic vinyl compound can be obtained by the following formula using the above-mentioned number-average molecular weight of the block copolymer.

$$Mn(a) = \{Mn \times a/(a+b)\}/N$$

[in the above formula, Mn(a) denotes the number-average molecular weight of one polymer block mainly composed of aromatic vinyl compound, Mn denotes the number-average molecular weight of the block copolymer comprising at least one polymer block mainly composed of aromatic vinyl compound and at least one polymer block mainly composed of conjugated diene compound, a denotes a weight percent of all polymer blocks mainly composed of aromatic vinyl compound in the block copolymer, b denotes a weight percent of all polymer blocks mainly composed of conjugated diene compound in the block copolymer, and N denotes the number of polymer blocks mainly composed of aromatic vinyl compound in the block copolymer].

Without departing from the spirit of the present invention, these block copolymers used in the present invention may be used in combination of two or more which differ in bond form, kind of aromatic vinyl compound, kind of conjugated diene compound, amount of 1,2-vinyl bond or amount of 1,2-vinyl bond and 3,4-vinyl bond, content of aromatic vinyl compound component and hydrogenation rate.

Furthermore, these block copolymers used in the present invention may be wholly or partially modified block copolymers.

The modified block copolymer is intended to mean a block copolymer modified with at least one modifying compound which has at least one carbon-carbon double bond or triple bond and at least one carboxylic acid group, acid anhydride group, amino group, hydroxyl group or glycidyl group in the molecular structure.

For producing the modified block copolymer, in the presence or absence of radical initiator, (1) the block copolymer is melt kneaded and reacted with a modifying compound at a temperature of not lower than the softening point of the block copolymer and not higher than 250° C., (2) the block copolymer and a modifying compound are reacted in a solution at a temperature of not higher than the softening point of the block copolymer, or (3) the block copolymer is reacted with a modifying compound at a temperature of not higher than the softening point of the block copolymer without melting the block copolymer and the modifying compound. Any of these methods can be used, but the method (1) is preferred, and the method (1) carried out in the presence of a radical initiator is most preferred.

As at least one modifying compound having at least one carbon-carbon double bond or triple bond and at least one carboxylic acid group, acid anhydride group, amino group, hydroxyl group or glycidyl group in the molecular structure, there may be used the same modifying compounds as mentioned above in connection with modification of polyphenylene ether.

Moreover, the resin composition of the present invention may contain an oil.

The oil used in the present invention includes inorganic or organic fats and oils which are liquid at 30° C., and they may be any of the synthetic oils, mineral oils, animal oils, vegetable oils, etc. Among them, preferred are vegetable oils such as soybean oil and linseed oil and heat transfer oils such as naphthenic oils, paraffinic oils, aromatic oils and benzyltoluene. Of these oils, more preferred are naphthenic oils, paraffinic oils and aromatic oils.

These oils are generally mixtures comprising a combination of three components of aromatic rings, naphthene rings and paraffin chains, and those in which the carbon number of paraffin chain occupies 50% or more of the total carbon number are called paraffinic oils, those in which the carbon number of naphthene ring occupies 30-45% of the total carbon number are called naphthenic oils and those in which the aromatic carbon number occupies 30% or more of the total carbon number are called aromatic oils.

Among them, especially preferred are the above-mentioned naphthenic oils or paraffinic oils, and the most preferred are paraffinic oils.

The oil mainly composed of paraffin is minutely a mixture of hydrocarbon compounds having a number-average molecular weight of 100-10000 which comprises three components of an aromatic ring-containing compound, a naphthene ring-containing compound and a paraffin compound, and has a content of the paraffin compound of 50% by weight or more.

In more detail, the oil mainly composed of paraffin comprises a combination of 50-90% by weight of a paraffinic compound, 10-40% by weight of a naphthene ring-containing compound and 5% by weight or less of an aromatic ring-containing compound and has a number-average molecular weight of preferably 100-2000, more preferably 200-1500.

One example of commercially available paraffinic oils is DIANA PROCESS OIL PW-380 (manufactured by Idemitsu Petrochemical Co., Ltd.) [kinematic viscosity: 381.6 cst (40° C.), average molecular weight: 746, carbon number of naphthene ring: 27%, carbon number of paraffin ring: 73%].

The method for adding the oil is not particularly limited. It may be added in the liquid state at the time of melt kneading of polyamide and polyphenylene ether, or it may be previously added to at least one selected from polyamide, polyphenylene ether and a block copolymer comprising at least one polymer block mainly composed of aromatic vinyl compound and at least one polymer block mainly composed of conjugated diene compound. Especially preferred is a method of previously incorporating the oil in the block copolymer comprising at least one polymer block mainly composed of aromatic vinyl compound and at least one polymer block mainly composed of conjugated diene compound.

By previously incorporating the oil in the block copolymer, the effects of inhibiting the occurrence of melt wrinkles and deformation of the molded product at heating can be further enhanced. When the oil is previously incorporated in the block copolymer, the preferred amount of the oil is less than 70 parts by weight based on 100 parts by weight of the block copolymer. The amount is more preferably less than 60 parts by weight.

Further, a compatibilizer may be added at the time of preparing the resin composition of the present invention. A main purpose for using a compatibilizer is to improve the physical properties of the polyamide-polyphenylene ether mixture. The compatibilizer used in the present invention is intended to mean a polyfunctional compound which interacts with polyphenylene ether, polyamide or both of them. This interaction may be a chemical one (for example, grafting) or a physical one (for example, change in surface characteristics of the disperse phase). Either way, the resulting polyamide-polyphenylene ether mixture shows improved compatibility.

Examples of the compatibilizer usable in the present invention are mentioned in detail in JP-A-8-8869, JP-A-9-124926, etc. and all of these known compatibilizers can be used and may also be used in combination.

Among these various compatibilizers, particularly suitable ones are, for example, maleic acid, maleic anhydride and citric acid.

The amount of compatibilizer in the present invention is preferably 0.01-20 parts by weight, more preferably 0.1-10 parts by weight based on 100 parts by weight of the mixture of polyamide and polyphenylene ether.

The relay block composed of the resin composition of the present invention may further contain a flame retardant. The flame retardant in this case is more preferably an inorganic or organic flame retardant containing substantially no halogen.

The wording "containing substantially no halogen" in the present invention means that the halogen concentration in the relay block containing the flame retardant is less than 2% by weight. The halogen concentration is more preferably less than 1% by weight, further preferably less than 0.5% by weight.

In the present invention, flame retardance of the resin composition containing the flame retardant containing substantially no halogen is desirably less than 20 mm/min. in burning velocity of a plate of 2 mm thick measured in accordance with FMVSS 571.302 standard. The burning velocity is more preferably less than 15 mm/min. Preferred burning velocity of a plate of 1 mm thick is preferably less than 40 mm/min.

The amount of flame retardant may be at least such an amount that improves the flame retardance measured by the above method. Specifically, it may be such an amount that can retard the burning velocity at least 10%, and it is preferred that the flame retardant is contained in an amount of about 5% by weight—about 25% by weight in the resin composition.

As examples of the usable flame retardants, mention may be made of known flame retardants, for example, inorganic flame retardants such as magnesium hydroxide and aluminum hydroxide, nitrogen-containing cyclic compounds such as melamine, cyanuric acid and salts thereof, organic phosphate esters such as triphenyl phosphate, triphenyl phosphate hydroxide and bisphenol A bis(diphenyl phosphate), phosphoric acid-based nitrogen-containing compounds such as ammonium polyphosphate and melamine polyphosphate, phosphazene compounds as disclosed in JP-A-11-181429, boric acid compounds such as zinc borate, silicone oils, red phosphorus, and other known frame retardants. Among them, more preferred are nitrogen-containing cyclic compounds such as melamine, cyanuric acid and salts thereof, organic phosphate esters such as triphenyl phosphate, triphenyl phosphate hydroxide and bisphenol A bis(diphenyl phosphate), phosphoric acid-based nitrogen-containing compounds such as ammonium polyphosphate and melamine polyphosphate, phosphazene compounds as disclosed in JP-A-11-181429, boric acid compounds such as zinc borate, and silicone oils.

Furthermore, in the present invention, fluorine-based polymers such as tetrafluoroethylene known as anti drip agents can also be used as flame retardants so long as the halogen concentration in the relay block is less than 2% by weight.

As a more preferred manner of addition of the flame retardant, there is a method of adding the flame retardant to the disperse phase resin and the continuous phase resin in the resin composition, respectively. Specifically, there is a method of adding to the respective phases at least one flame retardant selected from phosphate esters, nitrogen-containing cyclic compounds, phosphoric acid-based nitrogen-containing compounds, phosphazene compounds, boric acid compounds and silicone oils.

It is most preferred to add different flame retardants to the disperse phase resin and the continuous phase resin, respectively. Specifically, it is preferred to add at least one flame retardant selected from phosphate esters, phosphoric acid-based nitrogen-containing compounds, phosphazene compounds and silicone oils to the disperse phase and at least one flame retardant selected from nitrogen-containing cyclic compounds, phosphoric acid-based nitrogen-containing compounds and boric acid compounds to the continuous phase.

In the present invention, if necessary, other additional components may be added so long as the effect of the present invention is not damaged.

Examples of the additional components are other thermoplastic resins such as polyester and polyolefin, inorganic fillers (such as talc, kaolin, xonotlite, wollastonite, titanium oxide, potassium titanate, carbon fibers and glass fibers), known silane coupling agents for enhancing affinity between inorganic fillers and resins, plasticizers (such as low molecular weight polyolefin, polyethylene glycol and fatty acid esters), coloring agents such as carbon black, electric conductivity imparting agents such as carbon fibers, conductive carbon black and carbon fibrils, antistatic agents, various peroxides, antioxidants, ultraviolet absorbers, light stabilizers, etc.

The specific amount of these components may be not more than 50% by weight in the resin composition, more preferably less than 20% by weight, most preferably not more than 10% by weight.

Examples of the processing machines for obtaining the composition of the present invention are single-screw extruders, twin-screw extruders, rolls, kneaders, Brabender Plastograph, Banbury mixers, etc., and twin-screw extruders are preferred, and twin-screw extruders having an upstream side feed opening and one or more downstream side feed openings are most preferred.

The melt kneading temperature for obtaining the resin composition of the present invention is not particularly limited, and considering the kneading state, conditions for obtaining suitable compositions can be optionally selected usually from 240-360° C.

The thus obtained composition of the present invention can be utilized as various parts molded by various known methods such as injection molding.

The embodiments of the present invention will be explained in more detail by the following examples.

EXAMPLES 1-6 AND COMPARATIVE EXAMPLES 1 AND 2

First, starting materials used in the examples will be explained.

(Starting Materials Used)

(a) Polyphenylene Ether
  Poly(2,6-dimethyl-1,4-phenylene ether)
  Reduced viscosity=0.42 dl/g (measured by Ubbellohde viscosity tube)

(b) Polyamide
  PA 6,6-1
  Polyamide 6,6
  Viscosity number=140 ml/g (in accordance with ISO307: 1994 using 96% sulfuric acid) (The viscosity number hereinafter was measured in this way.)
  Concentration of terminal amino group=$4.5 \times 10^5$ mol/g
  Concentration of terminal carboxyl group=$7.5 \times 10^5$ mol/g
  PA 6,6-2
  Polyamide 6,6.
  Viscosity number=120 ml/g
  Concentration of terminal amino group=$3 \times 10^5$ mol/g
  Concentration of terminal carboxyl group=$1.1 \times 10^6$ mol/g
  PA 6,6-3
  Polyamide 6,6
  Viscosity number=120 ml/g
  Concentration of terminal amino group=$5.2 \times 10^5$ mol/g
  Concentration of terminal carboxyl group=$6 \times 10^5$ mol/g
  This polyamide contains 75 ppm of copper element and 2500 ppm of iodine.
  PA 6,6-MB
  Polyamide 6,6
  Viscosity number=120 ml/g
  Concentration of terminal amino group=$3 \times 10^5$ mol/g
  Concentration of terminal carboxyl group=$1.1 \times 10^6$ mol/g
  Master pellet containing 900 ppm of copper element and 18000 ppm of iodine in the polyamide.
  PA 6-MB
  Polyamide 6
  Viscosity number=120 ml/g
  Concentration of terminal amino group=50 milliequivalent/kg
  Concentration of terminal carboxyl group=65 milliequivalent/kg
  Master pellet containing 900 ppm of copper element and 18000 ppm of iodine in the polyamide (c) Block copolymer comprising at least one polymer block mainly composed of aromatic vinyl copolymer and at least one polymer block mainly composed of conjugated diene compound.
  SEBS-1
    Structure: A copolymer consisting of blocks of polystyrene-hydrogenated polybutadiene-polystyrene
    Number-average molecular weight=246,000

Number-average molecular weight of one polystyrene block=40,600

Total content of styrene components=33% by weight

Amount of 1,2-vinyl bond=33% (percentage of vinyl bond as defined above in the hydrogenated polybutadiene block, which is applied to the following)

Hydrogenation rate of polybutadiene portion=at least 98%

SEBS-2

Structure: A copolymer consisting of blocks of polystyrene-hydrogenated polybutadiene-polystyrene Number-average molecular weight=170,000

Number-average molecular weight of one polystyrene block=29,800

Total content of styrene components=35% by weight

Amount of 1,2-vinyl bond=38%

Hydrogenation rate of polybutadiene portion =at least 98%

This block copolymer contains 35% by weight of a paraffinic oil.

The number-average molecular weight of the block copolymer was measured by an ultraviolet spectrodetector (UV-41 manufactured by Showa Denko K.K.) using a gel permeation chromatography measuring apparatus (hereinafter referred to as GPC) (GPC SYSTEM 21 manufactured by Showa Denko K.K.) and calculated in terms of standard polystyrene. [Solvent: chloroform; temperature: 40° C.; columns: sample side (K-G, K-800ORL, K-800R), reference side (two of K-805L); flow rate: 10 ml/min.; measurement wavelength: 254 nm; pressure: 15-17 kg/cm$^2$]

Evaluation tests in the Examples and Comparative Examples were conducted in the following manner.

1. Reduced Viscosity of Polyphenylene Ether in Relay Block:

About 20 g of relay block molded articles were taken and were all sliced at a thickness of about 20 μm by a microtome, and flowed by subjecting to Soxhlet extraction with 50 ml of chloroform. The resulting chloroform solution (components soluble in chloroform: mainly polyphenylene ether and block copolymer were contained) was dropped into 300 g of methanol to carry out crystallization, followed by filtering and vacuum drying at 120° C. for 3 hours. One gram of the resulting powder was dissolved in 50 ml of methylene chloride and left to stand for 12 hours in a freezer. Only the component precipitated after 12 hours (only the polyphenylene ether component was precipitated) was filtered off and vacuum dried at 120° C. for 3 hours.

The resulting powder in an amount of 0.5 g was dissolved in 50 ml of chloroform, and viscosity was measured by Ubbellohde viscosity tube.

2. Melt Volume Rate (MVR):

This was measured in accordance with method B of ISO1133 at a test temperature of 280° C. under a load of 5.0 kg. Measurement was conducted on three different pellets, and the arithmetical average was taken as an MVR value. 3. Dimensional Change after Water Absorption:

Using a plate of type D2 (2 mm thick) specified in ISO294-3: 1996 which was molded in accordance with ISO 15103-2, except that the melting temperature was 290° C. and the mold temperature was 90° C., a dimensional change before and after water absorption treatment was calculated by the following formula.

$$S_{WP}=100(l_{2-1})/l_1$$

In the above formula, $S_{WP}$ represents a dimensional change after absorption of water, $l_1$ represents a length (unit: mm) of the molded type D2 plate in the direction parallel to the flow direction after the plate was subjected to conditioning by leaving for 48 hours in an environment of a temperature of 23° C. and a humidity of 50%, and $l_2$ represents a length (unit: mm) of the type D2 plate in the direction parallel to the flow direction after the above type D2 plate subjected to conditioning and measurement of dimension was left to stand for 72 hours in an environment of a temperature of 90° C. and a humidity of 95% and then taken out, followed by wiping off water on the surface of the molded piece, and then the plate was left to stand for 30 minutes in an environment of a temperature of 23° C. and a humidity of 50%.

Measurement of the $l_1$ and $l_2$ in this case was conducted on the central point in the width direction of the molded piece with a device capable of measuring to the order of 0.01 mm.

This measurement was conducted on five different test pieces and the arithmetical average of the resulting values was taken as a dimensional change after water absorption.

4. Anisotropy of Molding Shrinkage:

Using a flat plate of type D2 of 2 mm thick specified in ISO294-3: 1996 molded at a melting temperature of 290° C. and a mold temperature of 90° C. under the molding conditions specified in ISO15103-2: 1997, a molding shrinkage ($S_{Mp}$) in the direction parallel to the flow direction and a molding shrinkage ($S_{Mn}$) in the direction perpendicular to the flow direction were measured in accordance with ISO294-4: 1997.

The shrinkage was measured in the following manner. The sample just after molding was put in an aluminum-coated moistureproof bag, and after the bag was sealed and left to stand in a room of 23° C. for 24 hours to perform conditioning, the shrinkage was measured.

The anisotropy of molding shrinkage ($S_{ratio}$) was calculated from $S_{Mp}$ and $S_{Mn}$ by the following formula.

$$S_{ratio}=S_{Mn}/S_{Mp}$$

5. Deflection Temperature Under Load:

This was measured in accordance with ASTM D648-95 using a test piece of about 6.4 mm in width under a stress of 1.82 MPa. The measurement was conducted on five different test pieces and the arithmetical average of the results was taken as a deflection temperature under load.

Figure 1:
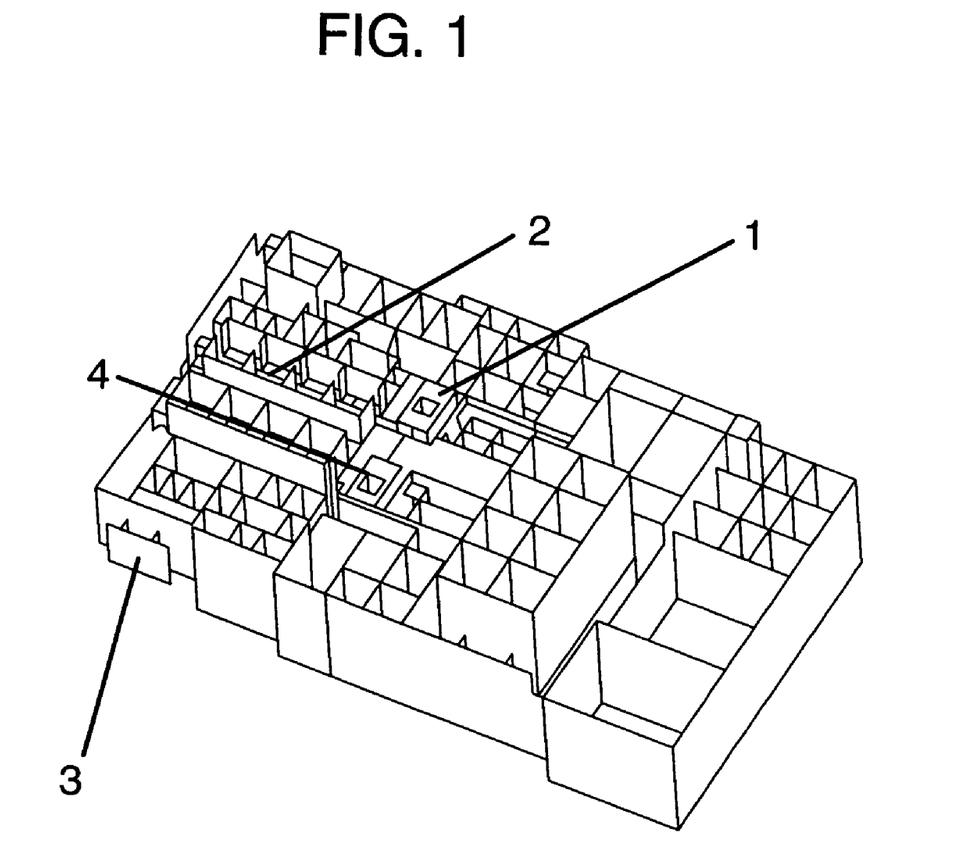
FIG. 1 is an external view of a relay block molded in the Examples given hereinafter, where the reference numeral 1 indicates a fuse socket portion, 2 indicates a relay socket portion, 3 indicates a fitting portion to a lower box, and 4 indicates a slit portion for inserting a bus bar.

6. Degree of Deformation of Slit Portion for Inserting of Bus Bar:

A relay block as shown in FIG. 1 was molded using an SG260M-S injection molding machine (manufactured by Sumitomo Heavy Industries Ltd.). The weight of this molded relay block was 310 g and the number of gates was eight. The minimum thickness of the thin wall portion was 0.15 mm and the maximum thickness of the thick wall portion was 2.5 mm.

Figure 2:
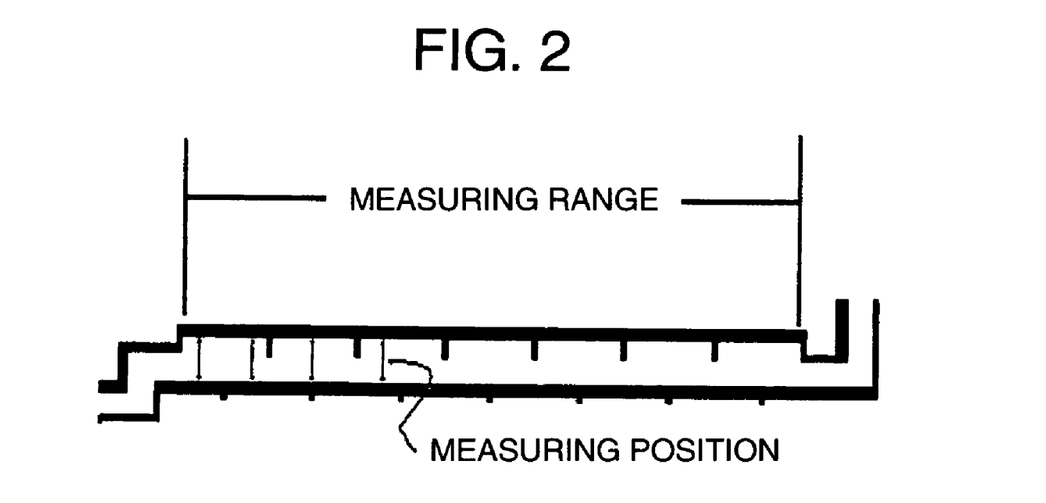
FIG. 2 is a schematic view of a slit portion for inserting a bus bar.

The cylinder temperature of the injection molding machine in this case was 290° C., and the mold temperature was 50° C. The molding cycle was 45 seconds. The injection pressure was set at the minimum pressure under which the relay block can be filled, and the molding was carried out applying a hold pressure which was 70% of the maximum pressure during the injection molding. The resulting molded piece was left to stand for 48 hours in an environment of a temperature of 23° C. and a humidity of 50%, and the distance (inner interval) between parallel planes at their uppermost portion which form a slit and are disposed opposite to each other at the periphery of the bus bar inserting slit having the shape as schematically shown in FIG. 2 was measured by a contact type three-dimensional dimension measuring device, and the difference between the maximum value and the minimum value thereof was obtained, and the difference was divided by a unit length (defined above) to obtain a degree of deformation of the slit portion for inserting a bus bar.

7. Observation of Presence or Absence of Melt Wrinkles (A Plurality of Parallel and Melt Wrinkles):

Ten relay blocks for evaluation of appearance were molded, and the presence or absence of a plurality of parallel and melt wrinkles as shown in FIG. 3A were visually confirmed on all of the resulting molded pieces. In this case, a single dent wrinkle as shown in FIG. 3B (which was a wrinkle of the weld portion) was seen on some relay blocks, but such wrinkles were excluded from the number of melt wrinkles.

As can be seen from Table 1, the present invention provides a resin composition which simultaneously satisfies the above-mentioned characteristics required for recent relay blocks (namely, reduction in melt viscosity of the resin per se constituting the relay block, decrease in dimensional change of the materials constituting the relay block due to absorption of water, and absence of melt wrinkles on the surface of molded articles of the relay block) and which has preferred values of deflection temperature under load and deformation of the bus bar portion, and further provides a relay block composed of the above resin composition.

TABLE 1

|  | Unit | Example 1 | Example 2 | Example 3 | Example 4 | Example 5 | Example 6 | Comparative Example 1 | Comparative Example 2 |
|---|---|---|---|---|---|---|---|---|---|
| PPE-L | part by weight | 30 | 30 | 30 |  | 30 | 30 | 30 | 18 |
| PPE-H |  |  |  |  | 30 |  |  |  |  |
| SEBS-1 |  | 10 | 10 |  |  |  |  | 10 | 7 |
| SEBS-2 |  |  |  | 10 | 10 | 10 | 10 |  |  |
| MAH |  | 0.2 | 0.2 | 0.2 | 0.2 | 0.2 | 0.2 | 0.2 | 0.2 |
| PA6, 6-1 |  |  |  |  | 55 |  |  | 60 | 75 |
| PA6, 6-2 |  |  |  |  |  | 55 | 52 |  |  |
| PA6, 6-3 |  | 60 | 55 | 60 |  |  |  |  |  |
| PA6, 6-MB |  |  |  |  | 5 |  |  |  |  |
| PA6-MB |  |  | 5 |  |  | 5 | 8 |  |  |
| Reduced viscosity of PPE |  | 0.433 | 0.435 | 0.430 | 0.539 | 0.428 | 0.425 | 0.437 | 0.439 |
| MVR | cm³/10 min. | 67 | 69 | 77 | 70 | 93 | 100 | 57 | 75 |
| Dimensional change after water absorption | % | 0.93 | 0.93 | 0.97 | 0.97 | 0.95 | 0.99 | 0.89 | 1.13 |
| Deflection temperature under load | ° C. | 127 | 119 | 115 | 108 | 116 | 107 | 154 | 101 |
| Degree of deformation of bus bar portion | % | 0.4 | 0.5 | 0.4 | 0.8 | 0.3 | 0.6 | 1.2 | 0.8 |
| Occurrence of wrinkles | — | No | No | No | No | No | No | Many | Some |

EXAMPLE 1

The cylinder temperature of a twin-screw extruder [ZSK-40 manufactured by Werner & Pfleiderer GmbH (Germany)] having one feed opening on the upstream side and one feed opening in the central part of the extruder was set at 320° C. in the area from the upstream side feed opening (hereinafter abbreviated as "main-F") up to the central feed opening (hereinafter abbreviated as "side-F") of the extruder and at 280° C. in the area from side-F up to the die.

In accordance with the proportions shown in Table 1, PPE-L, SEBS-1 and 0.2 part by weight of maleic anhydride (hereinafter abbreviated as "MAH") as a compatibilizer which were uniformly mixed were fed from main-F, and PA 6,6-3 in the proportion shown in Table 1 was fed from side-F, and these were melt kneaded to obtain pellets. In order to inhibit moisture absorption of the resulting pellets, the pellets were put in an aluminum-coated moistureproof bag immediately after they were extruded.

The screw revolution speed was 300 rpm, and the discharging rate was 80 kg/h. Moreover, residual volatile matter and residual oligomer were removed by carrying out vacuum suction from openings provided at a barrel just before the barrel having the side-F and the barrel just before the die. The degree of vacuum in this case was −700 mmHg.

The pellets obtained under various conditions were used as samples for various measurements. The anisotropy of molding shrinkage ($S_{ratio}$) in this case was 0.77.

EXAMPLES 2-6 AND COMPARATIVE EXAMPLES 1 AND 2

The procedure of Example 1 was repeated except that the proportions of PPE, SEBS, MAH and PA were changed as shown in Table 1. The results are shown in Table 1.

INDUSTRIAL APPLICABILITY

As mentioned above, the resin composition of the present invention can be utilized as molded articles of various parts. They can be suitably used for electrical equipment parts of motorbikes and automobiles, such as relay block materials, electric and electronic parts such as IC trays, chassis and cabinets of various disk players, OA parts and mechanical parts of various computers and peripheral parts thereof, exterior trim parts such as cowls of motorbikes, bumpers, fenders, door panels, various moldings, emblems, outer door handles, door mirror housings, wheel caps, roof rails and stays therefor, and spoilers of automobiles, interior trim parts such as instrument panels, console boxes and trims, etc. The resin composition of the present invention is particularly suitable for relay block materials.

The invention claimed is:

1. A relay block free from melt wrinkles and comprising a resin composition which contains a polyamide, a polyphenylene ether, a block copolymer comprising at least one polymer block mainly composed of an aromatic vinyl compound and at least one polymer block mainly composed of a conjugated diene compound, at least one transition metal selected from the group consisting of copper, nickel and cobalt and at least one halogen selected from the group consisting of chlorine, iodine and bromine, and which has a melt volume rate (MVR) [measured at a test temperature of 280° C. under a load of 5.0 kg in accordance with method B of ISO1133: 1997] of not less than 60 cm³/10 min., a dimensional change after water absorption [change of dimension in the flow direction after being subjected to water absorption treatment at a temperature of 90° C. and a humidity of 95% for 72 hours as compared with the dimension before subjecting to water absorption treatment (measured using a plate of type D2 of 2 mm thick specified in ISO294-3: 1996 which is molded at a melting temperature of 290° C. and a mold temperature of 90° C. under the molding conditions specified in ISO15103-2: 1997)] of not more than 1.0%, a reduced viscosity of polyphenylene ether in the resin composition of 0.40-0.45 dl/g, and the polyamide has a viscosity number of 100-130 ml/g measured in 96% sulfuric acid in accordance with ISO307:1994.

2. A relay block according to claim 1 which has, at a periphery of a slit of a bus bar inserting portion constituting a part of the relay block, parallel planes having the same shape which form the slit and are disposed opposite to each other, and has a degree of deformation between the parallel planes of not more than 1% (a value obtained by dividing the difference between the maximum and the minimum values of a distance in the horizontal direction between the parallel planes at the uppermost part of the parallel planes by a unit length of the parallel planes in the horizontal direction).

3. A relay block according to claim 1, wherein the ratio of wall thickness of the relay block (the ratio of thickness of the maximum wall thickness portion to the thickness of the minimum wall thickness portion) satisfies a range of not less than 10.

4. A relay block according to claim 1, wherein the weight of molded product per one gate in molding of the relay block is not less than 20 g.

5. A relay block according to claim 1, wherein the resin composition constituting the relay block has a deflection temperature under load [measured in accordance with ASTM D648-95 using a test piece of about 6.4 mm in width under a stress of 1.82 MPa] of not lower than 105° C.

6. A relay block according to claim 1, wherein the resin composition constituting the relay block has a shrinkage anisotropy (the ratio of molding shrinkage in the direction perpendicular to the flow direction to the molding shrinkage in the direction parallel to the flow direction measured in accordance with ISO294-4: 1997 using a plate of type D2 of 2 mm thick specified in ISO294-3: 1996 molded at a melting temperature of 290° C. and a mold temperature of 90° C. under the molding conditions specified in ISO15103-2: 1997) of 0.70-1.30.

7. A relay block according to claim 1, wherein the resin composition further contains an oil.

8. A relay block according to claim 1, wherein the content of polyamide in the resin composition is 55-70% by weight.

9. A relay block according to claim 1, wherein polyamide 6,6 is contained in an amount of not less than 70% by weight of the total amount of the polyamide in the resin composition.

10. A relay block according to claim 8 or 9, wherein the polyarnide in the resin composition is a mixture of polyamide 6,6 and polyamide 6.

11. A relay block comprising a resin composition which contains a polyamide, a polyphenylene ether, a block copolymer comprising at least one polymer block mainly composed of an aromatic vinyl compound and at least one polymer block mainly composed of a conjugated diene compound, at least one transition metal selected from the group consisting of copper, nickel and cobalt and at least one halogen selected from the group consisting of chlorine, iodine and bromine and further contains a flame retardant containing substantially no halogen in an amount effective for flame retardation of the resin composition, a reduced viscosity of polyphenylene ether in the resin composition being 0.40-0.45 dl/g, and the polyamide has a viscosity number of 100-130 ml/g measured in 96% sulfuric acid in accordance with ISO307:1994.

12. A relay block according to claim 11, wherein the flame retardant containing substantially no halogen comprises two or more flame retardants.

13. A relay block according to claim 11, wherein the flame retardant containing substantially no halogen is a mixture of a flame retardant effective for flame retardation of polyamide and a flame retardant effective for flame retardation of polyphenylene ether.

14. A relay block according to claim 11, wherein the resin composition has a melt volume rate (MVR) [measured at a test temperature of 280° C. and under a load of 5.0 kg in accordance with method B of ISO1133: 1997] of not less than 60 cm$^3$/10 min. and a dimensional change after water absorption [change of dimension in the flow direction after subjecting to water absorption treatment at a temperature of 90° C. and a humidity of 95% for 72 hours as compared with the dimension before subjecting to water absorption treatment (measured using a plate of type D2 of 2 mm thick specified in ISO294-3:1996 which is molded at a melting temperature of 290° C. and a mold temperature of 90° C. under the molding conditions specified in ISO15103-2: 1997)] of not more than 1.0%.

15. A relay block according to claim 11, wherein the resin composition has a deflection temperature under load [measured in accordance with ASTM D648-95 using a test piece of about 6.4 mm in width under a load of 1820 kPa] of not lower than 105° C.

16. A resin composition which contains a polyamide, a polyphenylene ether, a block copolymer comprising at least one polymer block mainly composed of an aromatic vinyl compound and at least one polymer block mainly composed of a conjugated diene compound, at least one transition metal selected from the group consisting of copper, nickel and cobalt, at least one halogen selected from the group consisting of chlorine, iodine and bromine and an oil, and which has a melt volume rate (MVR) [measured at a test temperature of 280° C. and under a load of 5.0 kg in accordance with method B of ISO1133: 1997] of not less than 60 cm$^3$/10 min., a dimensional change after water absorption [change of dimension of a molded piece in the flow direction after being subjected to water absorption treatment at a temperature of 90° C. and a humidity of 95% for 72 hours as compared with the dimension just after molding (measured using as the molded piece a plate of type D2 of 2 mm tick specified in ISO294-3: 1996 which is molded at a melting temperature of 290° C. and a mold temperature of 90° C. under the molding conditions specified in ISO15103-2: 1997)] of not more than 1.0%, a reduced viscosity of polyphenylene ether in the resin composition of 0.40-0.45 dl/g, and the polyamide has a viscosity number of 100-130 ml/g measured in 96% sulfuric acid in accordance with ISO307: 1994.

17. A resin composition according to claim 16, wherein the oil is mainly composed of paraffin.

18. A resin composition according to claim 16 wherein polyamide 6,6 is contained in an amount of not less than 70% by weight of the total amount of the polyamide.

19. A resin composition according to claim 16 or 18, wherein the polyamide is a mixture of polyamide 6,6 and polyamide 6.

20. A resin composition according to claim 16 wherein a content of the transition metal is 10-200 ppm and a content of the halogen is 500-1500 ppm.

21. A resin composition according to claim 16, wherein a transition metal and/or a halogen are previously mixed with the polyamide and then the polyamide is blended in the resin composition.

22. A resin composition according to claim 21, wherein the transition metal and/or the halogen are previously added to polyamide 6 at a high concentration (500 ppm or higher for the transition metal and 10000 ppm or higher for the halogen) and then the polyamide 6 is blended in the resin composition.

23. A resin composition according to claim 16 which contains a flame retardant containing substantially no halogen.

24. A resin composition according to claim 23, wherein the flame retardant containing substantially no halogen is a mixture of two or more flame retardants.

25. A resin composition according to claim 23 or 24, wherein the flame retardant containing substantially no halogen is a mixture of a flame retardant effective for flame retardation of polyamide and a flame retardant effective for flame retardation of polyphenylene ether.

* * * * *